(12) United States Patent
Kawakita et al.

(10) Patent No.: US 11,294,621 B2
(45) Date of Patent: Apr. 5, 2022

(54) CONTROL METHOD, TRANSMISSION DEVICE, AND RECEPTION DEVICE

(71) Applicant: Funai Electric Co., Ltd., Osaka (JP)

(72) Inventors: Mitsuru Kawakita, Osaka (JP); Takuya Suzuki, Aichi (JP); Kenichi Fukunaka, Osaka (JP); Yosuke Sonoda, Osaka (JP); Shigeru Toji, Osaka (JP); Masahiko Arashi, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 288 days.

(21) Appl. No.: 15/909,121

(22) Filed: Mar. 1, 2018

(65) Prior Publication Data

US 2018/0285067 A1     Oct. 4, 2018

(30) Foreign Application Priority Data

Apr. 4, 2017   (JP) .............................. JP2017-074487

(51) Int. Cl.
  *G10L 13/00*     (2006.01)
  *G06F 3/16*      (2006.01)
  (Continued)

(52) U.S. Cl.
  CPC ............. *G06F 3/167* (2013.01); *G06F 3/162* (2013.01); *G10L 13/08* (2013.01); *G10L 15/26* (2013.01);
  (Continued)

(58) Field of Classification Search
  CPC ......... G10L 15/08; G10L 15/26; G10L 15/30; G10L 15/285; G10L 15/32; G10L 15/34;
  (Continued)

(56) References Cited

U.S. PATENT DOCUMENTS 5,715,370 A * 2/1998 Luther .................... G06F 3/16
                                                         704/260
7,483,834 B2 * 1/2009 Naimpally .............. G10L 13/00
                                                         704/258
(Continued)

FOREIGN PATENT DOCUMENTS

JP        2011-151537 A      8/2011
JP        2014-150339 A      8/2014
JP        2017-33398 A       2/2017

OTHER PUBLICATIONS

N. P. Jawarkar, V. Ahmed and R. D. Thakare, "Remote Control using Mobile through Spoken Commands," 2007 International Conference on Signal Processing, Communications and Networking, 2007, pp. 622-625. (Year: 2007).*

(Continued)

*Primary Examiner* — Edgar X Guerra-Erazo
(74) *Attorney, Agent, or Firm* — Global IP Counselors, LLP

(57) ABSTRACT

A control method outputs audio indicating content of an operation of a transmission device connected to a reception device. The control method includes accepting the operation of the transmission device, generating operation data indicating the content of the operation by the transmission device, transmitting the operation data from the transmission device to the reception device, generating audio data indicating the content of the operation based on the operation data by the reception device, and outputting the audio indicated by the audio data by the reception device.

19 Claims, 10 Drawing Sheets

(51) Int. Cl.
*G10L 13/08* (2013.01)
*G10L 15/30* (2013.01)
*G10L 15/26* (2006.01)

(52) U.S. Cl.
CPC .............. *G10L 15/30* (2013.01); *G10L 13/00* (2013.01); *H04R 2420/07* (2013.01)

(58) Field of Classification Search
CPC ....... G10L 13/00; G10L 13/02; G10L 13/033; G10L 13/0335; G10L 13/04; G10L 13/047; G10L 13/07; G10L 13/06; G10L 2013/105; G10L 13/10
USPC ...................................................... 704/270.1
See application file for complete search history.

(56) References Cited

U.S. PATENT DOCUMENTS

| | | | | |
|---|---|---|---|---|
| 7,856,248 | B1* | 12/2010 | Fujisaki | H04M 1/6075 455/556.1 |
| 8,165,886 | B1* | 4/2012 | Gagnon | G10L 15/19 704/275 |
| 8,229,748 | B2* | 7/2012 | Chang | G09B 21/006 704/260 |
| 8,768,703 | B2* | 7/2014 | Chang | G10L 13/00 704/260 |
| 10,089,070 | B1* | 10/2018 | Kanjariya | G06F 3/167 |
| 10,871,936 | B2* | 12/2020 | Nakata | G06F 3/165 |
| 2003/0105639 | A1* | 6/2003 | Naimpally | G10L 13/00 704/276 |
| 2004/0228456 | A1* | 11/2004 | Glynn | G06Q 10/087 379/88.01 |
| 2005/0267758 | A1* | 12/2005 | Shi | G10L 13/10 704/260 |
| 2009/0327979 | A1* | 12/2009 | Haverinen | 715/864 |
| 2010/0026817 | A1* | 2/2010 | Ryan | H04N 7/147 348/207.11 |
| 2010/0280956 | A1* | 11/2010 | Chutorash | G06Q 20/20 705/64 |
| 2011/0111741 | A1* | 5/2011 | Connors | H04W 4/08 455/414.3 |
| 2012/0054796 | A1* | 3/2012 | Gagnon | H04N 21/488 725/40 |
| 2012/0158984 | A1* | 6/2012 | Maitre | H04N 21/43615 709/231 |
| 2012/0204110 | A1* | 8/2012 | Cabral | G10L 13/00 715/727 |
| 2013/0121666 | A1* | 5/2013 | Furuya | H04N 21/440263 386/248 |
| 2013/0157571 | A1* | 6/2013 | Wondka | A61B 5/08 455/41.2 |
| 2014/0181865 | A1* | 6/2014 | Koganei | H04N 21/4828 725/38 |
| 2014/0211961 | A1* | 7/2014 | Koch | G08C 17/02 381/77 |
| 2015/0243163 | A1* | 8/2015 | Shoemake | H03M 13/09 367/197 |
| 2016/0171982 | A1* | 6/2016 | Kore | G10L 13/00 704/235 |
| 2017/0154625 | A1* | 6/2017 | Heo | G10L 15/22 |
| 2018/0174406 | A1* | 6/2018 | Arashi | H04N 21/4852 |
| 2018/0210696 | A1* | 7/2018 | Woolstenhulme | H04R 3/00 |
| 2018/0285067 | A1* | 10/2018 | Kawakita | G10L 15/26 |
| 2018/0293046 | A1* | 10/2018 | Nakata | G11B 27/005 |
| 2020/0066402 | A1* | 2/2020 | Bechtel | G10L 15/22 |

OTHER PUBLICATIONS

T. M. Moran, "Formatted voice messages in tactical communication," [1992] Proceedings of the Tactical Communications Conference, 1992, pp. 165-170 vol. 1. (Year: 1992).*

* cited by examiner

| ID DATA | TEXT DATA |
|---|---|
| 1 | Play |
| 2 | Stop |
| 3 | Pause |
| 4 | Skip |
| 5 | Skip Back |
| 6 | Fast Forward |
| 7 | Fast Reverse |
| ⋮ | ⋮ |

*FIG. 6*

CONTROL METHOD, TRANSMISSION DEVICE, AND RECEPTION DEVICE

CROSS-REFERENCE TO RELATED APPLICATIONS

This application claims priority to Japanese Patent Application No. 2017-074487 filed on Apr. 4, 2017. The entire disclosure of Japanese Patent Application No. 2017-074487 is hereby incorporated herein by reference.

BACKGROUND

Field of the Invention

The present invention relates to a control method, a transmission device, and a reception device.

Background Information

In the "Twenty-First Century Communications and Video Accessibility Act of 2010 (CVAA)" in the United States, manufacturers of digital equipment (such as television sets or digital video players/recorders, etc.) are obligated to equip digital devices with functions that can be utilized by users who are blind or have impaired vision.

For this reason, digital devices are required to come with a TTS (Text-To-Speech) function for reading text. With this TTS function, when a television set is turned on using a remote control, audio indicating the power-on can be outputted from the television set, for example.

SUMMARY

However, with a digital device such as a DVD (Digital Versatile Disc) player or a BD (Blu-ray Disc™) player, when audio produced by a TTS function is outputted from the digital device, restrictions may occur in playback of the video content due to performance limitations.

One object is to provide a control method, a transmission device, and a reception device with which audio produced by a TTS function can be outputted without constraint.

In view of the state of the known technology and in accordance with an aspect of the present invention, a control method outputs audio indicating content of an operation of a transmission device connected to a reception device. The control method comprising accepting the operation of the transmission device, generating operation data indicating the content of the operation by the transmission device, transmitting the operation data from the transmission device to the reception device, generating audio data indicating the content of the operation based on the operation data by the reception device, and outputting the audio indicated by the audio data by the reception device.

Also other objects, features, aspects and advantages of the present disclosure will become apparent to those skilled in the field of control methods from the following detailed description, which, taken in conjunction with the annexed drawings, discloses several embodiments of control methods with various features.

BRIEF DESCRIPTION OF THE DRAWINGS

Referring now to the attached drawings which form a part of this original disclosure:

FIG. 6 is a diagram showing an example of a table stored in a memory of the playback device pertaining to the third embodiment;

Figure 1:
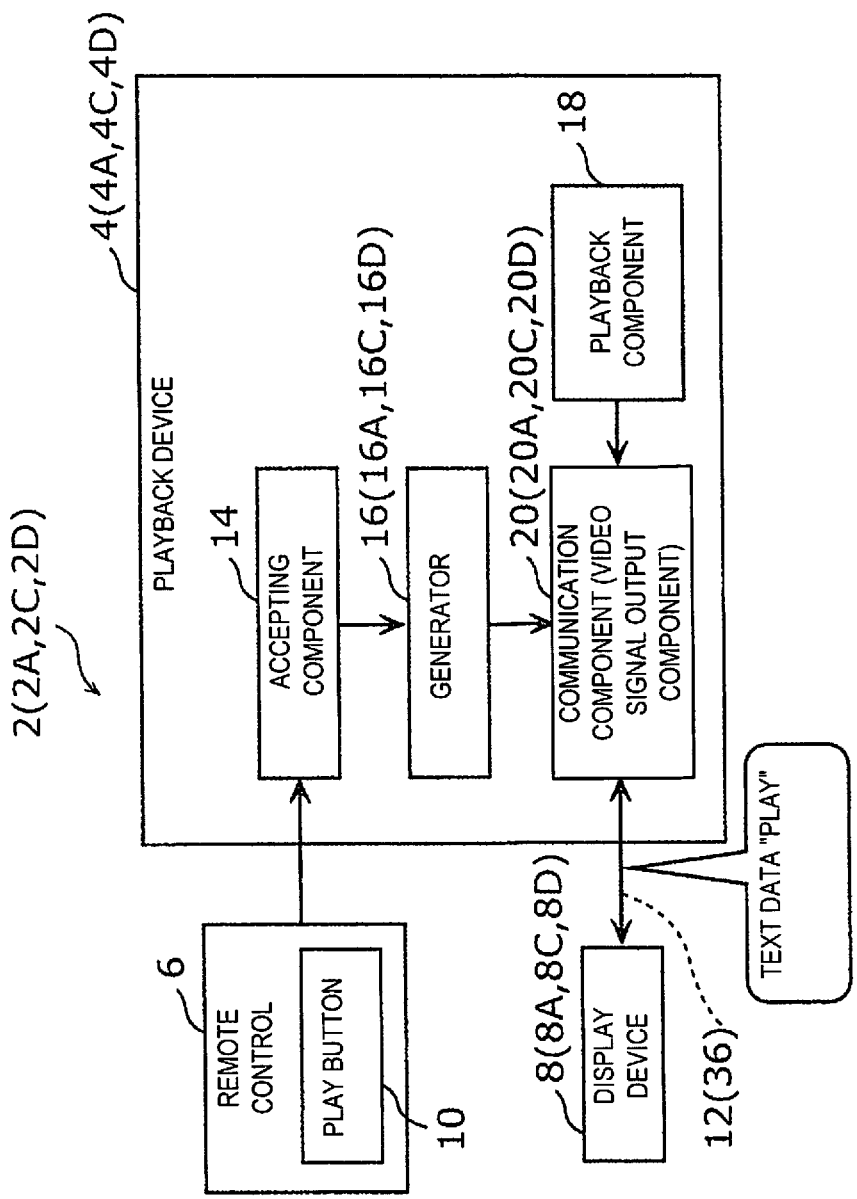
FIG. 1 is a block diagram of a playback device pertaining to a first embodiment (and second, fourth and fifth embodiments)

It should be noted that these figures are intended to illustrate the general characteristics of methods, structure and/or materials utilized in certain illustrative embodiments and to supplement the written description provided below. These drawings are not, however, to scale and may not precisely reflect the precise structural or performance characteristics of any given embodiment, and should not be interpreted as defining or limiting the range of values or properties encompassed by illustrative embodiments. The use of similar or identical reference numbers in the various drawings is intended to indicate the presence of a similar or identical element or feature.

DETAILED DESCRIPTION OF EMBODIMENTS

Selected embodiments will now be explained with reference to the drawings. It will be apparent to those skilled in the field of control methods, transmission devices and reception devices from this disclosure that the following descriptions of the embodiments are provided for illustration only and not for the purpose of limiting the invention as defined by the appended claims and their equivalents. Numerical values, shapes, materials, constituent elements, layout positions of constituent elements, connection modes, and the like shown in the following embodiments are merely examples, and are not intended to limit the present invention. Also, of the constituent elements in the following embodiments, those constituent elements not described in an independent claim are described as optional constituent elements. Like reference numerals in the drawings denote like similar or identical elements or features, and thus the descriptions of the similar or identical elements or features may be omitted in later embodiments.

First Embodiment 1-1. System Configuration

Figure 2:
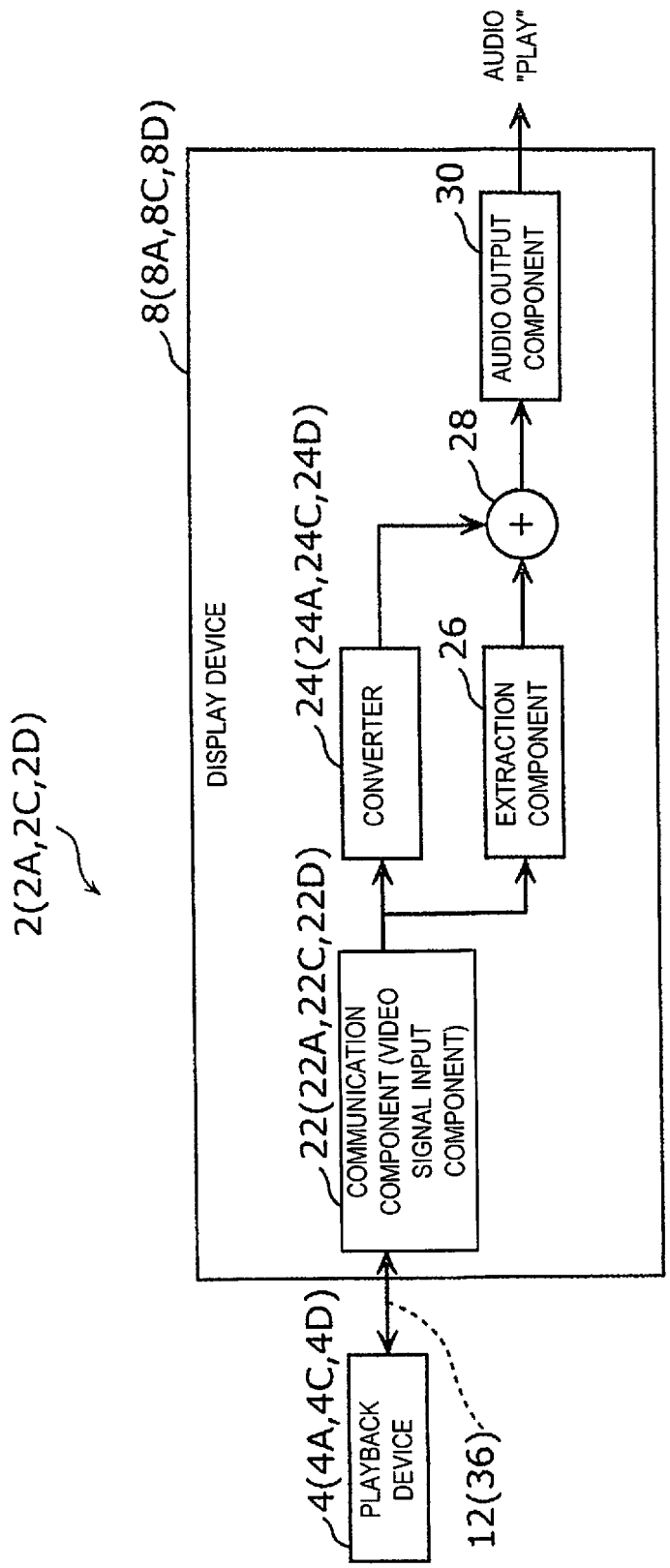
FIG. 2 is a block diagram of a display device pertaining to the first embodiment (and the second, fourth and fifth embodiments)

First, the configuration of a system 2 pertaining to a first embodiment will be described through reference to FIGS. 1 and 2. FIG. 1 is a block diagram of a playback device 4 pertaining to the first embodiment. FIG. 2 is a block diagram of a display device 8 pertaining to the first embodiment.

As shown in FIGS. 1 and 2, the system 2 includes the playback device 4 (an example of a transmission device), a remote controller 6 (hereinafter "remote control 6"), and the display device 8 (an example of a reception device).

The playback device 4 is, for example, a digital video player for playing video content. In the illustrated embodiment, the video content is stored on an optical disc, such as a DVD, a BD, or the like. Of course, the video content can be stored in other type of storage devices that are internally or externally provided relative to the playback device 4.

The remote control 6 is a controller for operating the playback device 4. The remote control 6 is used by the user. The remote control 6 is provided with a plurality of buttons for operating the playback device 4. The buttons on the remote control 6 include, for example, a play button 10 for playing (for playing back) the video content. Of course, the remote control 6 can include any other conventional buttons for operating the playback device 4, but the detailed configuration will not be discussed for the sake of brevity. In the illustrated embodiment, the remote control 6 is an infrared remote control that emits infrared lights according to the operated buttons. Of course, the remote control 6 can be other type of remote controls, such as radio remote controls that transmit radio signals (Bluetooth signals, Wi-Fi signals, and the like).

The display device 8 is, for example, a display for displaying the video content played by the playback device 4. In the illustrated embodiment, the display device 8 is a television set, for example. In the illustrated embodiment, the display device 8 is a liquid crystal display, for example. However, the display device 8 can be other type of display devices.

Both the playback device 4 and the display device 8 are HDMI™ (High-Definition Multimedia Interface) devices (HDMI compatible devices). The playback device 4 and the display device 8 are connected together via an HDMI cable 12 (an example of a digital cable). The HDMI cable 12 is a cable that conforms to the HDMI standard, and is a cable for transmitting and receiving digital signals. The HDMI standard is a communication interface standard for transmitting video and audio as digital signals. Of course, the playback device 4 and the display device 8 can be other type of devices that conform with other type of digital communication standards, and can be connected via other type of digital cables for transmitting and receiving digital signals.

Under the HDMI standard, CEC (Consumer Electronics Control) for linking between a plurality of HDMI devices is stipulated. According to CEC, CEC commands are sent back and forth bidirectionally between the HDMI devices. This communication is called CEC communication. This CEC communication allows, for example, the power-on of the display device 8 to be carried out in conjunction with the power-on of the playback device 4.

Also, the playback device 4 and the display device 8 are each equipped with a ITS (Text-To-Speech) function. This TTS function is a function of converting text data into audio data and outputting audio that indicates this audio data. In particular, in this embodiment, the term TTS function refers to an audio output function for supporting the operation of a digital device (e.g., the playback device 4) by a user who is blind or has impaired vision.

1-2. Configuration of Playback Device

Next, the configuration of the playback device 4 pertaining to the first embodiment will be described through reference to FIG. 1. Of a plurality of functional configurations of the playback device 4, only the functional configurations related to the present invention will be described below. Thus, of course, the playback device 4 can include other conventional components, but will not be discussed in detail for the sake of brevity.

As shown in FIG. 1, the playback device 4 comprises an accepting component 14, a generator 16 (an example of an operation data generator), a playback component 18, and a communication component 20 (an example of a transmitter).

The accepting component 14 receives a remote control signal from the remote control 6 and thereby accepts an operation (such as an operation to play video content) of the playback device 4 with the remote control 6. In the illustrated embodiment, the accepting component 14 can be a receiver circuit that receives the remote control signal from the remote control 6. For example, the accepting component 14 can be an IR receiver circuit. Of course, the accepting component 14 can be other type of receiver circuits, such as radio receivers that receive radio signals (Bluetooth signals, Wi-Fi signals, and the like) from the remote control 6. The accepting component 14 output control signals to the generator 16 according to the content of the operation of the playback device 4.

The generator 16 generates operation data indicating the content of the operation accepted by the accepting component 14. Specifically, the generator 16 generates the operation data according to the control signals received from the accepting component 14. The operation data is data including text data and a terminating character (NULL data). In this embodiment, the text data is data of a character string of 13 bytes or less. For example, if the operation accepted by the accepting component 14 is to play the video content, then the generator 16 generates text data of a character string "Play" indicating the content of the operation. In particular, in the illustrated embodiment, the generator 16 determines text data according to the control signals received from the accepting component 14. For example, a plurality of sets of text data is predetermined corresponding to the control signals or the content of the operation, and stored in a storage device of the generator 16 or the playback device 4. In response receiving the control signals from the accepting component 14, the generator 16 determines text data according to the control signals by referring to the storage device. Then, the generator 16 generates the operation data by adding the NULL data to the text data. Of course, the generator 16 can generate the operation data in a different manner, as needed and/or desired. In the illustrated embodiment, the generator 16 basically includes a microcomputer or processor. The generator 16 can further include other conventional components such as an input interface circuit, an output interface circuit, and storage devices, such as a ROM (Read Only Memory) device and a RAM (Random Access Memory) device, flash memory, etc. For example, the internal RAM of the generator 16 stores processing results of the generator 16. The internal ROM of the generator 16 stores the information and programs for various operations. It will be apparent to those skilled in the field of playback devices from this disclosure that the precise structure and algorithms for the generator 16 can be any combination of hardware and software that will carry out the functions of the system 2 as described herein.

The playback component 18 plays video content. In the illustrated embodiment, the video content is stored on an optical disc, such as a DVD or a BD, for example. In this case, the playback component 18 has an optical disc drive for playback of the optical disc and a signal processor for outputting the video content to the communication component 20. The detailed configuration of the playback component 18 is relatively conventional, and thus will not be discussed in detail herein. Of course, the video content can be stored on a storage device internally or externally provided relative to the playback device 4.

The communication component 20 includes a HDMI module with a CEC communication interface, for example. The communication component 20 transmits and receives various kinds of data to and from the display device 8 (an example of an external device). More specifically, the communication component 20 transmits a CEC command, the operation data, the video content, and the like to the display device 8, for example. Of course, the communication component 20 can be other type of communication modules as needed and/or desired.

1-3. Configuration of Display Device

Next, the configuration of the display device 8 pertaining to the first embodiment will be described through reference to FIG. 2. Of the plurality of functional configurations of the display device 8, only the functional configurations related to the present invention will be described below. Thus, of course, the display device 8 can include other conventional components, but will not be discussed in detail for the sake of brevity.

As shown in FIG. 2, the display device 8 comprises a communication component 22 (an example of a receiver), a converter 24 (an example of an audio data generator), an extraction component 26, a combiner 28, and an audio output component 30 (an example of an output component).

The communication component 22 includes a HDMI module with a CEC communication interface, for example. The communication component 22 transmits and receives various kinds of data to and from the playback device 4 (an example of an external device). Specifically, the communication component 22 receives, for example, the CEC commands, the operation data, the video content, and the like from the playback device 4.

The converter 24 converts the text data of the operation data received by the communication component 22 into TTS audio data (an example of audio data). That is, the TTS audio data is audio data indicating the content of the operation accepted by the accepting component 14 of the playback device 4. The converter 24 can be a typical TTS system, and thus will not be described in detail herein for the sake of brevity.

The extraction component 26 extracts content audio data from the video content received by the communication component 22.

The combiner 28 combines the TTS audio data from the converter 24 with the content audio data from the extraction component 26. In the illustrated embodiment, the converter 24, the extraction component 26 and the combiner 28 have at least one processor with at least one control program. More specifically, the converter 24, the extraction component 26 and the combiner 28 can be a microcomputer that in addition to the at least one processor further includes other conventional components such as an input interface circuit, an output interface circuit, and storage devices, such as a ROM (Read Only Memory) device and a RAM (Random Access Memory) device, flash memory, etc. In the illustrated embodiment, a TTS program can cause a processor to convert the text data to the TTS audio data as the converter 24. Also, an extraction program can cause a processor to extract the content audio data from the video content as the extraction component 26. Furthermore, a combining program can cause a processor to combine the ITS audio data with the content audio data as the combiner 28. Of course, it will be apparent to those skilled in the field of display devices from this disclosure that the precise structure and algorithms for the converter 24, the extraction component 26 and the combiner 28 can be any combination of hardware and software that will carry out the functions of the system 2 as described herein.

The audio output component 30 is a speaker for outputting the audio indicated by the TTS audio data and the content audio data combined by the combiner 28. The audio output component 30 superimposes the audio indicated by the TTS audio data and the audio indicated by the content audio data, and outputs the result. For instance, when the operation accepted by the accepting component 14 of the playback device 4 is an operation to play video content, as shown in FIG. 2, then the audio output component 30 outputs audio/sound pronounced as "Play" (synthetic voice) so as to indicate the content of the operation, as the audio indicated by the TTS audio data.

1-4. System Operation

Figure 3:
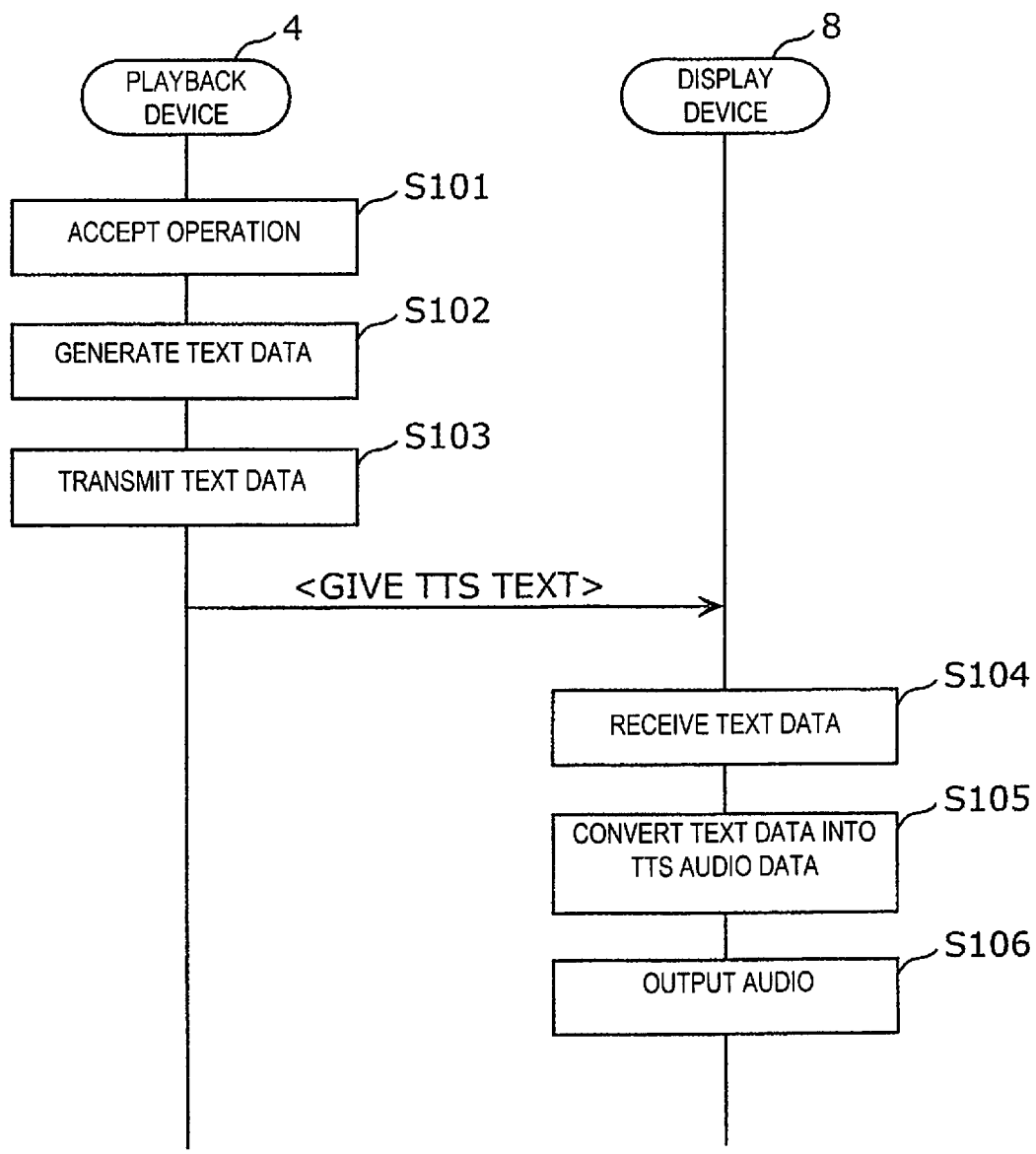
FIG. 3 is a sequence diagram showing the operation of a system pertaining to the first embodiment.

Next, the operation of the system 2 pertaining to the first embodiment (the control method in the system 2) will be described through reference to FIG. 3. FIG. 3 is a sequence diagram showing the operation of the system 2 pertaining to the first embodiment.

As shown in FIG. 3, first the user operates the playback device 4 with the remote control 6 so that the accepting component 14 of the playback device 4 accepts the operation of the playback device 4 (step S101). For example, when the user presses the play button 10 on the remote control 6, then the accepting component 14 accepts the operation to play video content.

After this, the generator 16 of the playback device 4 generates the operation data with the text data that indicates the content of the operation accepted by the accepting component 14 (step S102). For example, when the operation accepted by the accepting component 14 is the operation to play video content, then the generator 16 generates text data of a character string "Play" indicating the content of the operation.

After this, the communication component 20 of the playback device 4 transmits to the display device 8 a <GIVE TTS TEXT> command (a CEC command) and the operation data with the text data generated by the generator 16 (step S103).

After this, the communication component 22 of the display device 8 receives from the playback device 4 the <GIVE TTS TEXT> command and the operation data with the text data (step S104).

After this, the converter 24 of the display device 8 converts the text data of the operation data received by the communication component 22 into the TTS audio data (step S105). Also, the extraction component 26 extracts the content audio data from the video content received by the communication component 22, and the combiner 28 combines the TTS audio data from the converter 24 with the content audio data from the extraction component 26.

After this, the audio output component 30 superimposes the audio indicated by the TTS audio data with the audio indicated by the content audio data, and outputs the result (step S106). For example, when the operation accepted by the accepting component 14 of the playback device 4 is the operation to play video content, then the audio output component 30 outputs the audio pronounced as "Play," that indicates the content of the operation.

1-5. Effect

Next, the effect obtained with the system 2 pertaining to the first embodiment will be described. When outputting the audio produced by the TTS function from the playback device 4, there may be constraints imposed on the playback of the video content due to performance limitations of the playback device 4. In such a case, with the system 2 pertaining to the first embodiment, when the accepting component 14 of the playback device 4 accepts the operation of the playback device 4, instead of outputting the audio produced by the TTS function from the playback device 4, it is instead outputted from the display device 8 connected by HDMI to the playback device 4. This makes it possible to output the audio produced by the TTS function without constraint. Thus, in the illustrated embodiment, the audio output component 30 of the display device 8 outputs the audio indicating the content of the operation in response to the operation of the playback device 4.

Second Embodiment 2-1. System Operation

Figure 4:
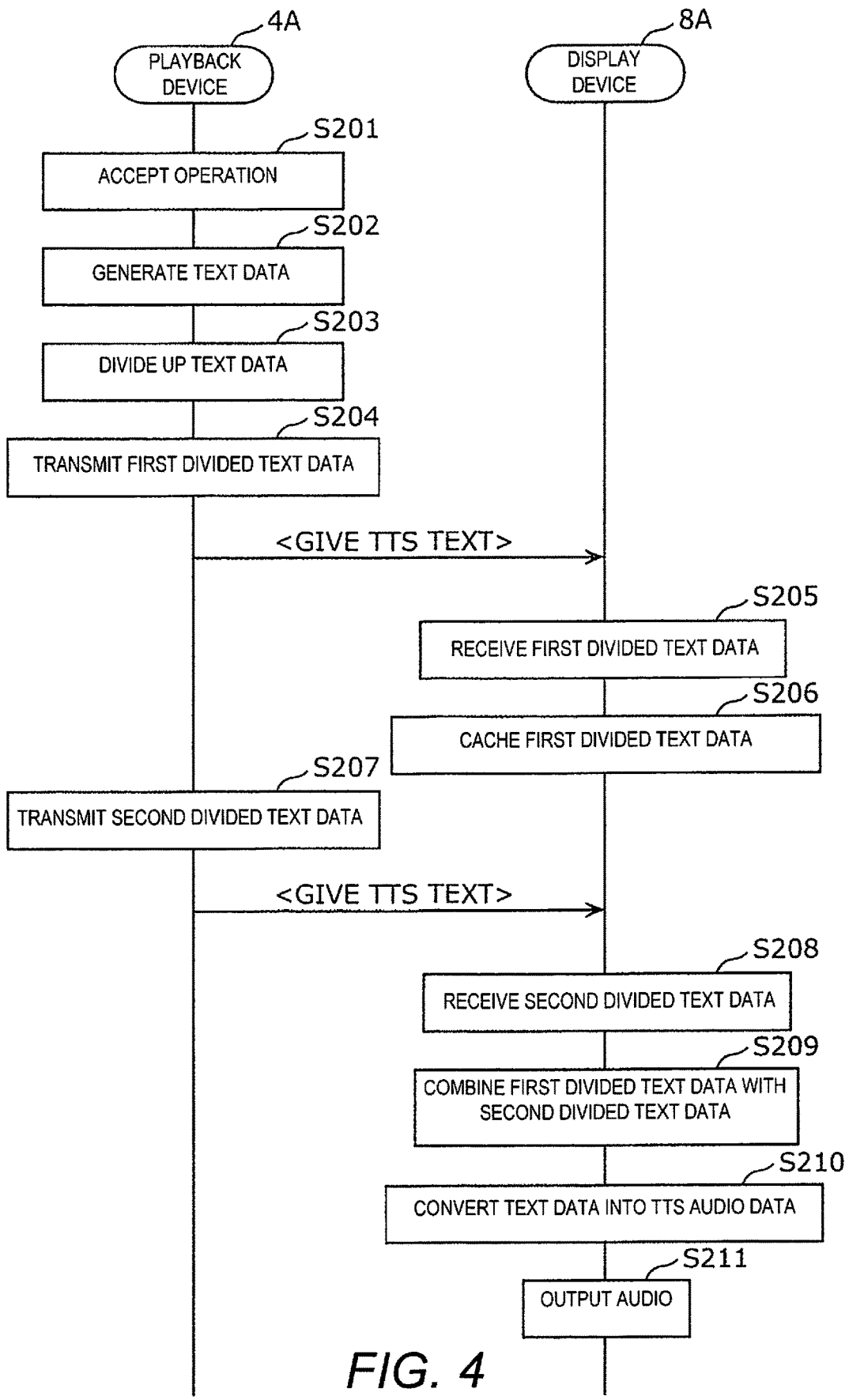
FIG. 4 is a sequence diagram showing the operation of a system pertaining to the second embodiment.

Next, the operation of a system 2A pertaining to a second embodiment will be described through reference to FIGS. 1, 2, and 4. FIG. 4 is a sequence diagram showing the operation of the system 2A pertaining to the second embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In general, operation data exceeding 14 bytes (14 bytes or more of text data+1 byte of terminating character) cannot be transmitted in a single time due to constraints of CEC. Therefore, with the system 2A (see FIG. 1) pertaining to the second embodiment, when the text data is data of a character string exceeding 13 bytes (an example of a threshold value), the text data is divided up into a plurality of sets of divided text data, and these sets of divided text data are sequentially transmitted from a playback device 4A to a display device 8A. The operation of the system 2A pertaining to the second embodiment will now be described in specific terms. As illustrated in FIG. 1, the configuration of the playback device 4A is basically identical to the playback device 4. In particular, as illustrated in FIG. 1, the playback device 4A includes the accepting component 14, a generator 16A, the playback component 18 and a communication component 20A. The configurations of the generator 16A and the communication component 20A are basically identical to the generator 16 and the communication component 20 pertaining to the first embodiment, respectively, except for the configurations described below, and thus will not be discussed in detail for the sake of brevity. Also, as illustrated in FIG. 2, the configuration of the display device 8A is basically identical to the display device 8 pertaining to the first embodiment. In particular, as illustrated in FIG. 2, the display device 8A includes a communication component 22A, a converter 24A, the extraction component 26, the combiner 28 and the audio output component 30. The configurations of the communication component 22A and the converter 24A are basically identical to the communication component 22 and the converter 24 pertaining to the first embodiment, respectively, except for the configurations described below, and thus will not be discussed in detail for the sake of brevity.

As shown in FIG. 4, first the user operates the playback device 4A with the remote control 6 (see FIG. 1) so that the accepting component 14 (see FIG. 1) of the playback device 4A accepts the operation of the playback device 4A (step S201).

After this, the generator 16A (see FIG. 1) of the playback device 4A generates operation data with the text data that indicates the content of the operation accepted by the accepting component 14 (step S202). At this point, if the text data is data of a character string exceeding 13 bytes (20 bytes, for example), then the generator 16A divides up the text data into a plurality of sets of divided text data (step S203). In this embodiment, a case is described in which the text data is divided up into two sets of divided text data (i.e., first divided text data and second divided text data). On the other hand, if the text data is data of a character string that does not exceed 13 bytes, then the steps S103 to S106 illustrated in FIG. 3 are executed instead of the steps S203 to S211 illustrated in FIG. 4.

After step S203, the communication component 20A (see FIG. 1) of the playback device 4A transmits a <GIVE TTS TEXT> command and first operation data to the display device 8A (step S204). The first operation data includes only the first divided text data (14 bytes, for example), and does not include the terminating character.

After this, the communication component 22A (see FIG. 2) of the display device 8A receives the <GIVE TTS TEXT> command and the first operation data from the playback device 4A (step S205).

After this, if the converter 24A (see FIG. 2) of the display device 8A determines that no terminating character is included in the first operation data received by the communication component 22A, then the first divided text data is cached (step S206).

After this, the communication component 20A of the playback device 4A transmits to the display device 8A the <GIVE TTS TEXT> command and second operation data (step S207). The second operation data includes the second divided text data (6 bytes, for example) and the terminating character (1 byte).

After this, the communication component 22A of the display device 8A receives the <GIVE TTS TEXT> command and the second operation data from the playback device 4A (step S208).

After this, if the converter 24A of the display device 8A determines that a terminating character is included in the second operation data received by the communication component 22A, then the cached first divided text data and the second divided text data received this time are combined together (step S209), and text data is generated (restored).

After this, the converter 24A converts the generated text data into TTS audio data (step S210), and the audio output component 30 outputs audio indicating the TTS audio data (step S211).

2-3. Effect

In this embodiment, even when the text data is data of a character string that exceeds 13 bytes, it is still possible to transmit the text data from the playback device 4A to the display device 8A.

In the illustrated embodiment, a case of dividing up the text data into two sets of divided text data is described. However, this is not the only option. The data may be divided up into three or more sets of divided text data.

Further, in this embodiment, if the converter 24A determines that a terminating character is included in the operation data received by the communication component 22A, then a plurality of sets of divided text data are combined. However, there are no restrictions on the timing when the sets of divided text data are combined. For instance, the converter 24A may sequentially combine the sets of divided text data every time divided text data is received.

Third Embodiment 3-1. System Configuration

Figure 5:
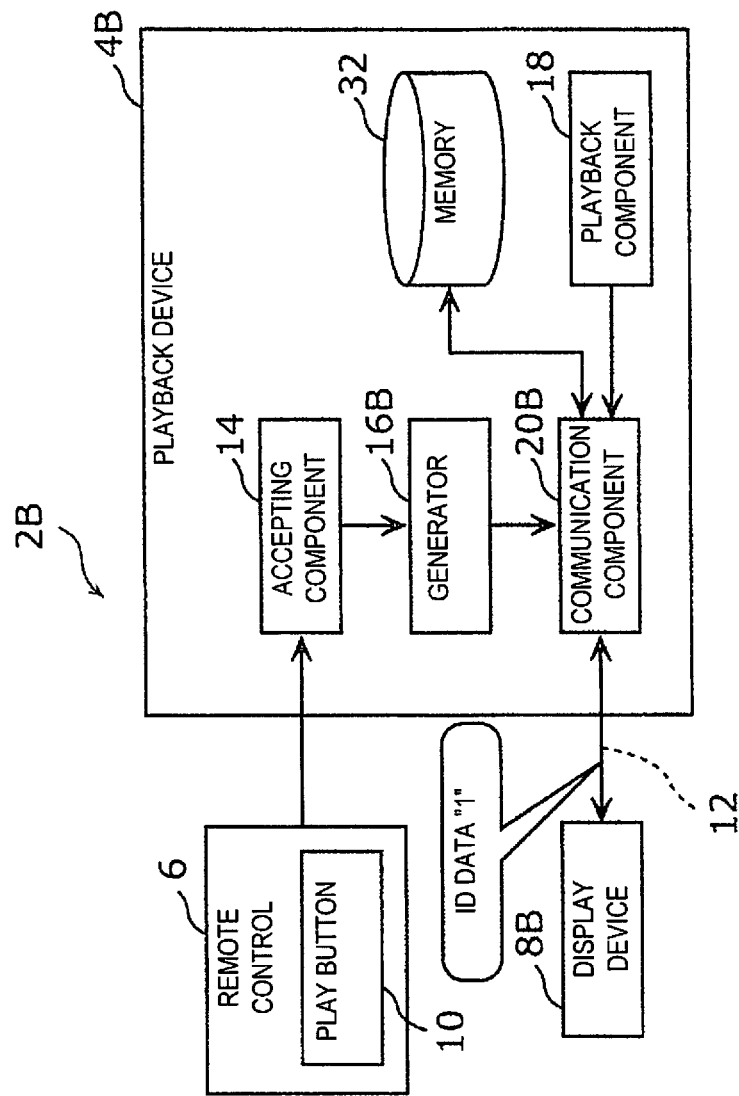
FIG. 5 is a block diagram of a playback device pertaining to a third embodiment.
Figure 7:
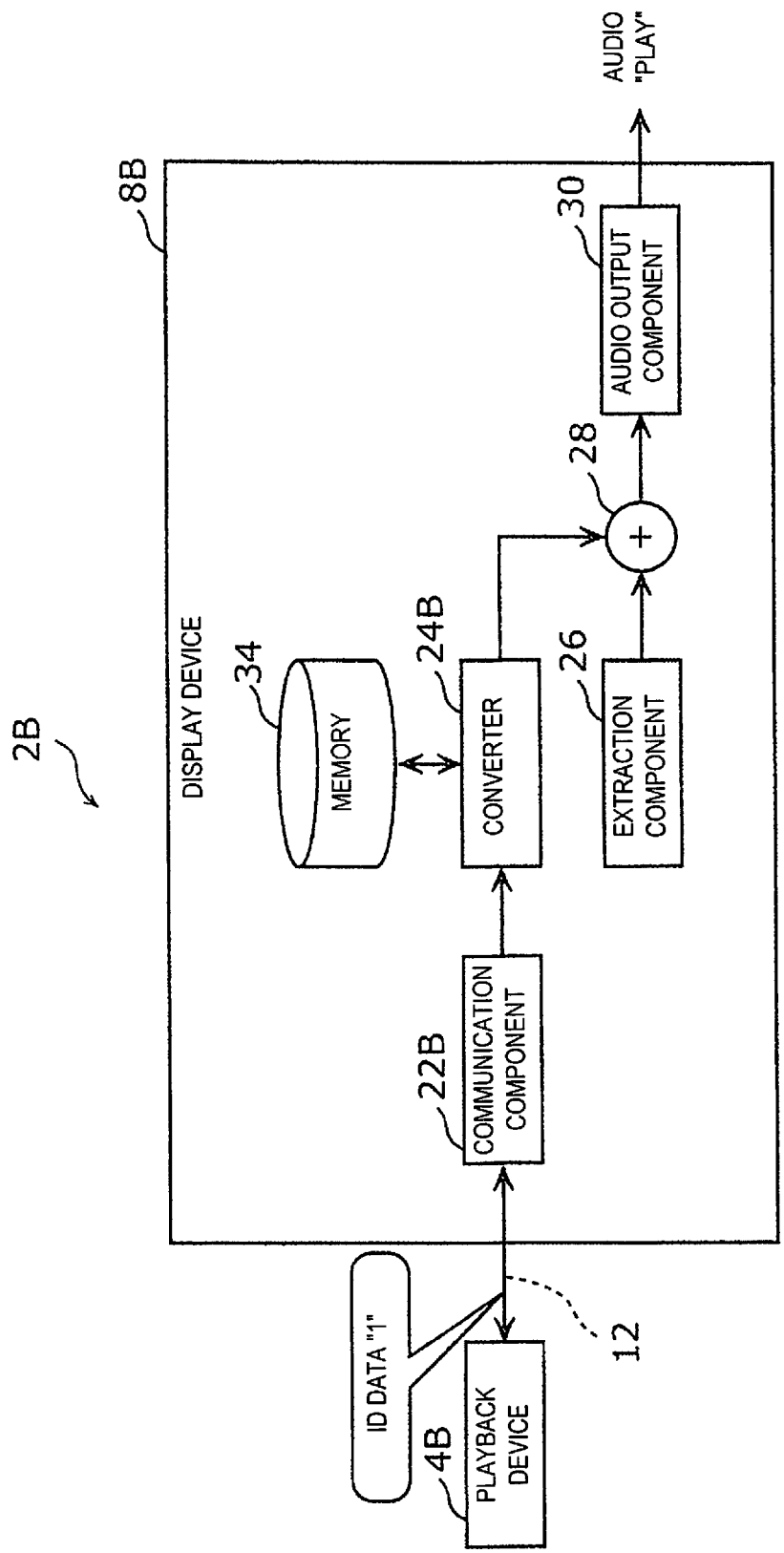
FIG. 7 is a block diagram of a display device pertaining to the third embodiment.

The configuration of a system 2B pertaining to a third embodiment will now be described through reference to FIGS. 5 to 7. FIG. 5 is a block diagram showing the configuration of a playback device 4B in the third embodiment. FIG. 6 is a diagram showing an example of a table stored in a memory 32 of the playback device 4B pertaining to the third embodiment. FIG. 7 is a block diagram showing the configuration of a display device 8B pertaining to the third embodiment. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the system 2B pertaining to the third embodiment, instead of the text data, ID (identification) data is transmitted as the operation data from the playback device 4B to the display device 8B. The configuration of the system 2B pertaining to the third embodiment will now be described. As illustrated in FIG. 5, the configuration of the playback device 4B is basically identical to the playback device 4. In particular, as illustrated in FIG. 5, the playback device 4B includes the accepting component 14, a generator 16B, the playback component 18 and a communication component 20B. The configurations of the generator 16B and the communication component 20B are basically identical to the generator 16 and the communication component 20 pertaining to the first embodiment, respectively, except for the configurations described below, and thus will not be discussed in detail for the sake of brevity. Also, as illustrated in FIG. 7, the configuration of the display device 8B is basically identical to the display device 8 pertaining to the first embodiment. In particular, as illustrated in FIG. 7, the display device 8B includes a communication component 22B, a converter 24B, the extraction component 26, the combiner 28 and the audio output component 30. The configurations of the communication component 22B and the converter 24B are basically identical to the communication component 22 and the converter 24 pertaining to the first embodiment, respectively, except for the configurations described below, and thus will not be discussed in detail for the sake of brevity.

As shown in FIG. 5, the playback device 4B further comprises the memory 32 in addition to the above-mentioned configurations. The memory 32 stores a table in which text data each indicating a content of an operation of the playback device 4B are associated with ID data for identifying the text data. The ID data is, for example, data represented by the numbers "1," "2," "3," and so on. In the example shown in FIG. 6, the text data "Play" indicating the operation of playing video content is associated with the ID data "1." The text data "Stop" indicating the operation of stopping the playback of video content is associated with the ID data "2." The text data "Pause" indicating the operation of pausing playback of the video content is associated with the ID data "3."

The generator 16B generates ID data corresponding to the operation received by the accepting component 14 based on the table stored in the memory 32.

The communication component 20B transmits the table stored in the memory 32 to the display device 8B upon startup of the playback device 4B in advance. The communication component 20B transmits the ID data generated by the generator 16B to the display device 8B.

As shown in FIG. 7, the display device 8B further comprises a memory 34 in addition to the above-mentioned configurations. The memory 34 stores the table received by the communication component 22B in advance.

The communication component 22B receives the table in advance, and store the table in the memory 34. The communication component 22B also receives the ID data from the playback device 4B.

The converter 24B reads the text data corresponding to the ID data received by the communication component 22B, from the table stored in the memory 34, and converts the read text data into TTS audio data.

3-2. System Operation

Figure 8:
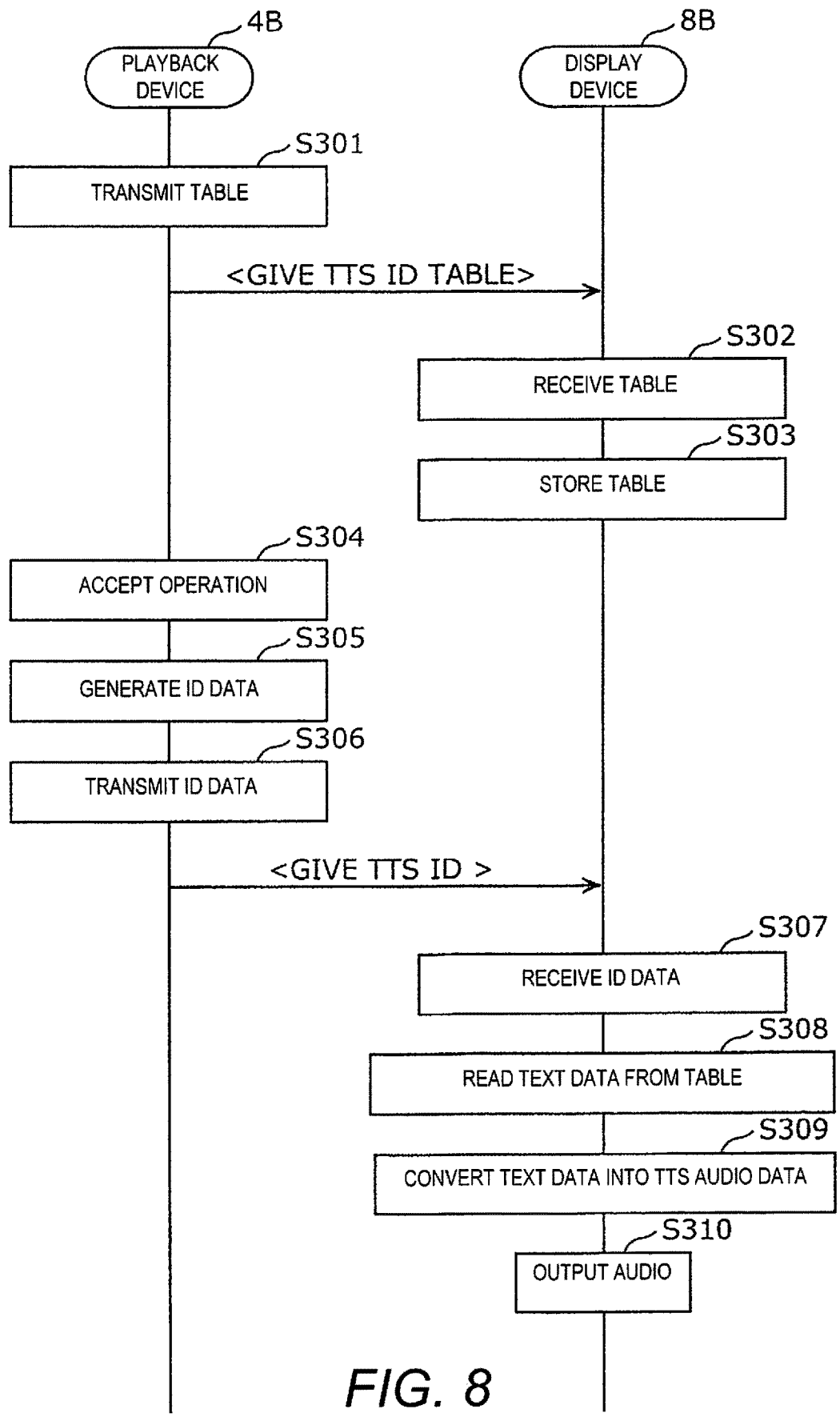
FIG. 8 is a sequence diagram showing the operation of a system pertaining to the third embodiment.

The operation of the system 2B pertaining to the third embodiment will now be described through reference to FIG. 8. FIG. 8 is a sequence diagram showing the operation of the system 2B pertaining to the third embodiment.

As shown in FIG. 8, first, at the startup of the playback device 4B, the communication component 20B of the playback device 4B sends a <GIVE TTS ID TABLE> command (a CEC command) and the table stored in the memory 32 to the display device 8B (step S301).

After this, the communication component 22B of the display device 8B receives the <GIVE TTS ID TABLE> commands and the table from the playback device 4B (step S302). The table received by the communication component 22B is stored in the memory 34 (step S303).

When the user operates the playback device 4B with the remote control 6, the accepting component 14 of the playback device 4B accepts the operation of the playback device 4B (step S304). For example, if the user presses the play button 10 on the remote control 6, the accepting component 14 accepts the operation of playing video content.

After this, the generator 16B of the playback device 4B generates the operation data with the ID data corresponding to the operation accepted by the accepting component 14 (step S305). For example, if the operation accepted by the accepting component 14 is an operation of playing video content, the generator 16B generates ID data "1" corresponding to the operation (see FIG. 6).

After this, the communication component 20B of the playback device 4B transmits the <GIVE TTS ID> command (a CEC command) and the operation data with the ID data generated by the generator 16B to the display device 8B (step S306).

After this, the communication component 22B of the display device 8B receives the <GIVE TTS ID> command and the operation data with the ID data from the playback device 4B (step S307).

After this, the converter 24B of the display device 8B reads the text data corresponding to the ID data received by the communication component 22B, from the table stored in the memory 34 (step S308). For example, if the operation accepted by the accepting component 14 is an operation of playing video content, the converter 24B reads the text data "Play" corresponding to the ID data "1." The converter 24B converts the read text data into TTS audio data (step S309).

After this, the audio output component 30 outputs audio indicating the TTS audio data (step S310). For example, if the operation accepted by the accepting component 14 of the playback device 4B is an operation of playing video content, the audio output component 30 outputs audio pronounced as "Play" that indicates the content of the operation.

3-3. Effect

In this embodiment, the ID data, rather than the text data, is transmitted from the playback device 4B to the display device 8B. Thus, the size of the data transmitted from the playback device 4B to the display device 8B can be kept small.

Fourth Embodiment 4-1. System Configuration

The configuration of a system 2C pertaining to a fourth embodiment will now be described through reference to FIGS. 1 and 2. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

As shown in FIGS. 1 and 2, with the system 2C pertaining to the fourth embodiment, a playback device 4C and a display device 8C are connected together via an analog cable 36. The analog cable 36 is a cable for transmitting and receiving analog signals. As illustrated in FIG. 1, the configuration of the playback device 4C is basically identical to the playback device 4. In particular, as illustrated in FIG. 1, the playback device 4C includes the accepting component 14, a generator 16C, the playback component 18 and a video signal output component 20C. The configurations of the generator 16C and the video signal output component 20C are basically identical to the generator 16 and the communication component 20 pertaining to the first embodiment, respectively, except for the configurations described below, and thus will not be discussed in detail for the sake of brevity. Also, as illustrated in FIG. 2, the configuration of the display device 8C is basically identical to the display device 8 pertaining to the first embodiment. In particular, as illustrated in FIG. 2, the display device 8C includes a video signal input component 22C, a converter 24C, the extraction component 26, the combiner 28 and the audio output component 30. The configurations of the video signal input component 22C and the converter 24C are basically identical to the communication component 22 and the converter 24 pertaining to the first embodiment, respectively, except for the configurations described below, and thus will not be discussed in detail for the sake of brevity.

In the illustrated embodiment, the generator 16C of the playback device 4C superposes the generated text data over data of a private data class included in the analog video signal (an example of a video signal) of the video content. A private data class is a type of packet of a closed caption XDS (extended data service).

For example, a vertical blanking interval is set at the start of an analog video signal, such as an NTSC (National Television Standard Committee) signal, as an interval that is needed in order for the electron beam that has scanned from the top of a screen (first field) to the bottom to go back to the top of the next screen (second field). For NTSC signals, the first scan line (line 1 of the first field, line 263 of the second field) to the 21$^{st}$ scan line (line 21 of the first field, line 284 of the second field) are set in a vertical blanking interval. Of these vertical blanking intervals, data of the private data class is added to the 21$^{st}$ scan line (line 284 of the second field).

A private data class is defined as being usable only in a closed network, so it can be utilized in a situation where the display device 8C and the playback device 4C are connected, as in the system 2C of this embodiment. Also, while caption data produced by closed captioning uses line 21 of the first field, the private data class uses line 284 of the second field. Therefore, subtitle display and audio output by the TTS function can be handled simultaneously.

4-2. System Operation

Figure 9:
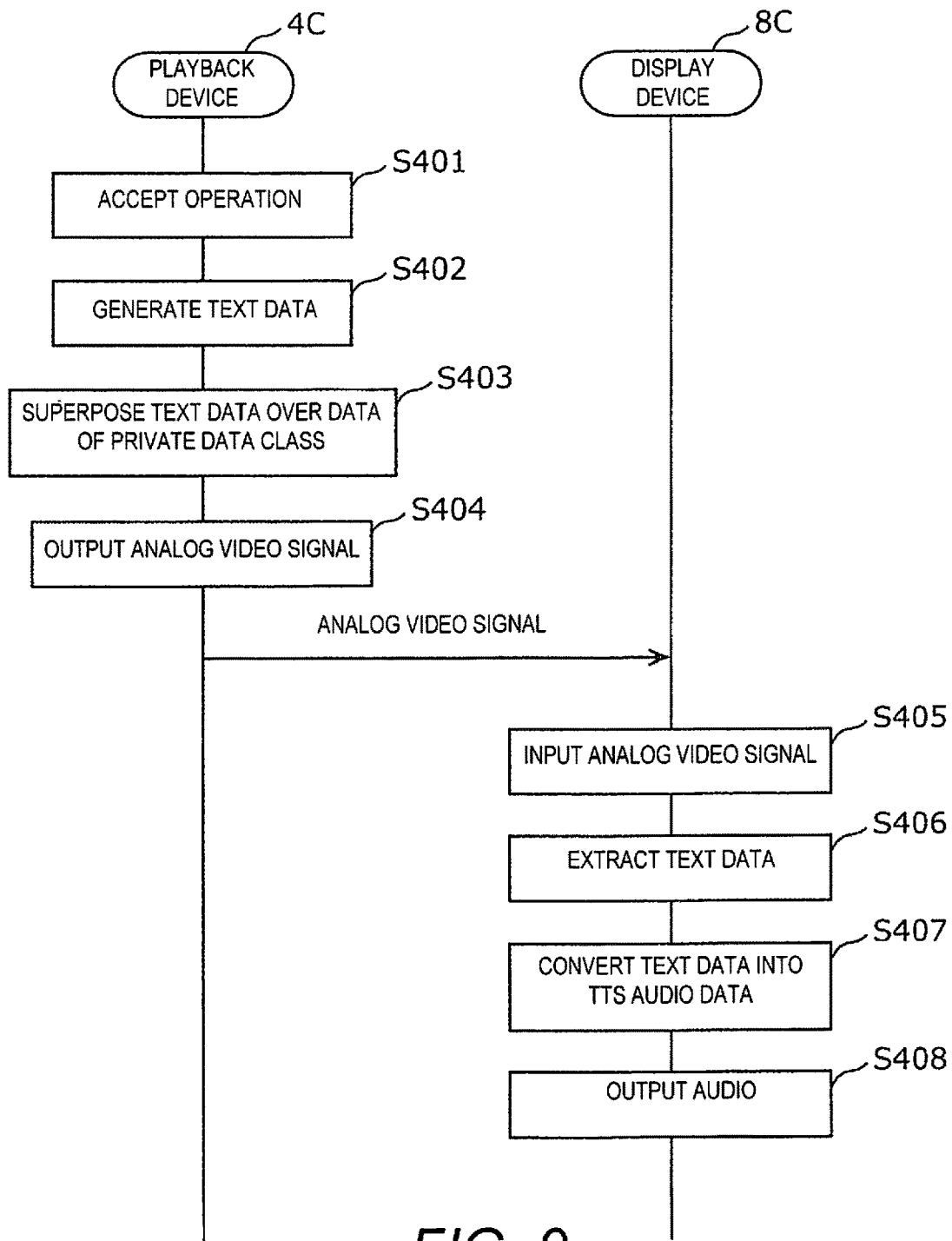
FIG. 9 is a sequence diagram showing the operation of a system according to the fourth embodiment.
Figure 10:
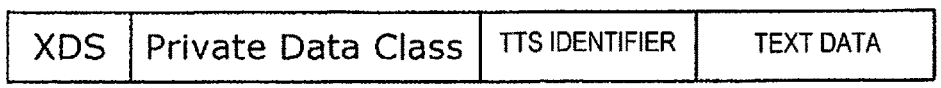
FIG. 10 is a diagram showing an example of a data structure of a private data class.

The operation of the system 2C pertaining to the fourth embodiment will now be described through reference to FIGS. 9 and 10. FIG. 9 is a sequence diagram showing the operation of the system 2C pertaining to the fourth embodiment. FIG. 10 shows an example of the data structure of the private data class.

As shown in FIG. 9, first, the user operates the playback device 4C with the remote control 6, and the accepting component 14 of the playback device 4C accepts the operation of the playback device 4C (step S401).

After this, the generator 16C of the playback device 4C generates the operation data with the text data indicating the content of the operation accepted by the accepting component 14 (step S402). The generator 16C superposes the generated text data over the data of the private data class included in the analog video signal of the video content (step S403). At this point, as shown in FIG. 10, the generator 16C provides the private data class with a TTS identifier indicating it to be text data of the TTS function.

After this, the video signal output component 20C (an example of a transmitter) of the playback device 4C outputs to the display device 8C an analog video signal in which the operation data with the text data has been superposed over the data of the private data class (step S404).

After this, the video signal input component 22C (an example of a receiver) of the display device 8C inputs the analog video signal from the playback device 4C (step S405), and extracts the operation data with the text data superposed over the data of private data class of the analog video signal (step S406).

After this, the converter 24C of the display device 8C coverts the text data of the extracted operation data into TTS audio data (step S407). The audio output component 30 (see FIG. 3) outputs audio indicating the TTS audio data (step S408).

4-3. Effect

In this embodiment, when the playback device 4C and the display device 8C are connected via the analog cable 36, an analog video signal in which text data is superposed over the data of the private data class can be outputted from the playback device 4C to the display device 8C.

Fifth Embodiment 5-1. System Configuration

The configuration of a system 2D pertaining to a fifth embodiment will now be described through reference to FIGS. 1 and 2. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

As shown in FIGS. 1 and 2, with the system 2D pertaining to the fifth embodiment, a playback device 4D and a display device 8D are connected together via the analog cable 36, just as in the fourth embodiment above. As illustrated in FIG. 1, the configuration of the playback device 4D is basically identical to the playback device 4. In particular, as illustrated in FIG. 1, the playback device 4D includes the accepting component 14, a generator 16D, the playback component 18 and a video signal output component 20D. The configurations of the generator 16D and the video signal output component 20D are basically identical to the generator 16 and the communication component 20 pertaining to the first embodiment, respectively, except for the configurations described below, and thus will not be discussed in detail for the sake of brevity. Also, as illustrated in FIG. 2, the configuration of the display device 8D is basically identical to the display device 8 pertaining to the first embodiment. In particular, as illustrated in FIG. 2, the display device 8D includes a video signal input component 22D, a converter 24D, the extraction component 26, the combiner 28 and the audio output component 30. The configurations of the video signal input component 22D and the converter 24D are basically identical to the communication component 22 and the converter 24 pertaining to the first embodiment, respectively, except for the configurations described below, and thus will not be discussed in detail for the sake of brevity.

In the illustrated embodiment, the generator 16D of the playback device 4D superposes the generated text data over the closed captioning data included in the analog video signal of the video content. More specifically, the generator 16D rewrites the caption data produced by closed captioning over the text data.

5-2. System Operation

Figure 11:
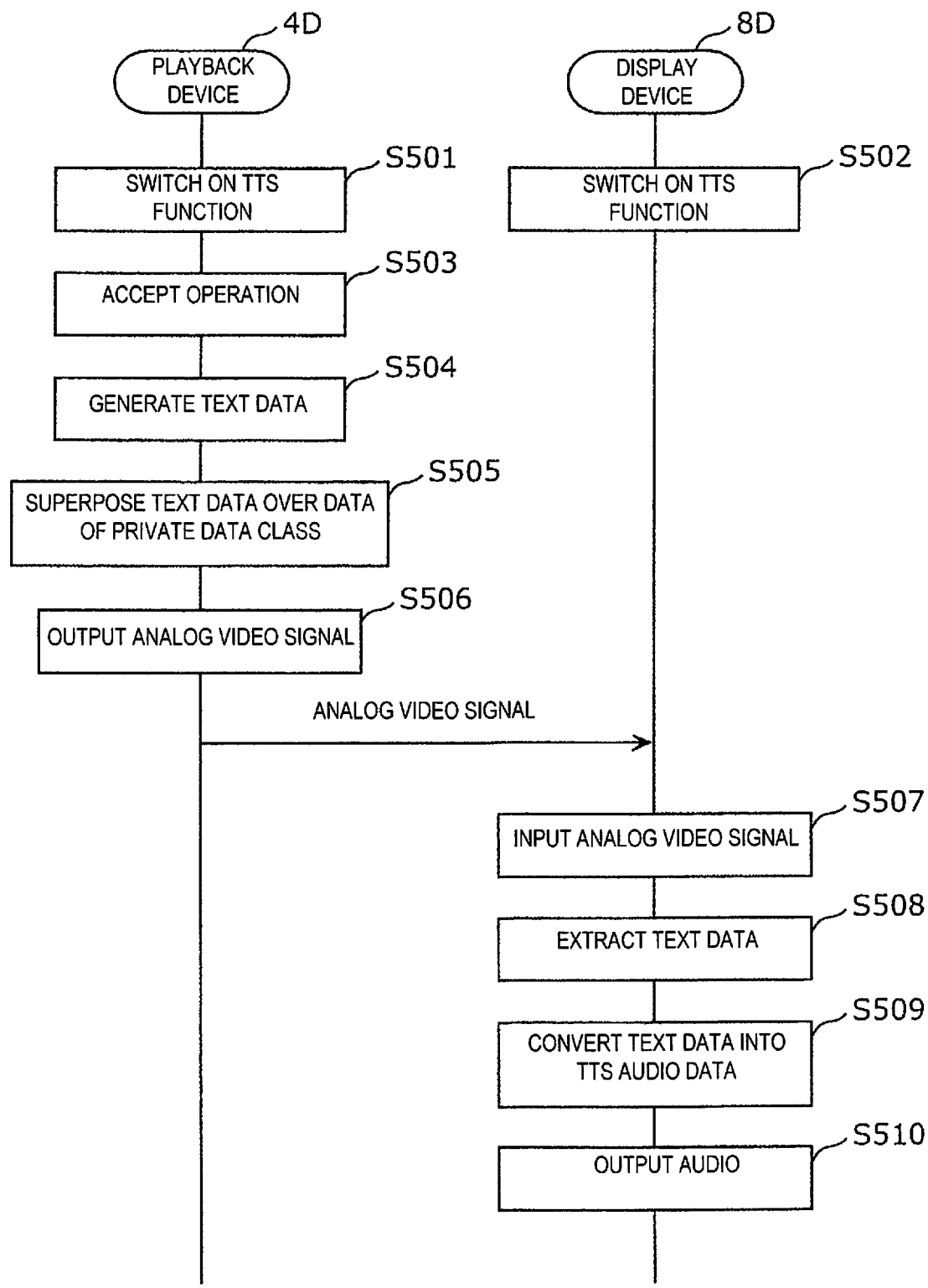
FIG. 11 is a sequence diagram showing the operation of a system pertaining to the fifth embodiment.

The operation of the system 2D pertaining to the fifth embodiment will now be described through reference to FIG. 11. FIG. 11 is a sequence diagram showing the operation of the system 2D pertaining to the fifth embodiment.

As shown in FIG. 11, first, the user manually switches on both the TTS function of the playback device 4D and the TTS function of the display device 8D (steps S501 and S502).

After this, the user operates the playback device 4D with the remote control 6, and the accepting component 14 of the playback device 4D accepts the operation of the playback device 4D (step S503).

After this, the generator 16D of the playback device 4D generates the operation data with the text data indicating the content of the operation accepted by the accepting component 14 (step S504). The generator 16D superposes the generated text data over the data of the closed captioning included in the analog video signal of the video content (step S505).

After this, the video signal output component 20D of the playback device 4D outputs to the display device 8D an analog video signal in which the operation data with the text data is superposed over the data of the closed captioning (step S506).

After this, the video signal input component 22D of the display device 8D inputs the video signal from the playback device 4D (step S507), and extracts the operation data with the text data superposed over the data of the closed captioning of the analog video signal (step S508).

After this, the converter 24D of the display device 8D (see FIG. 2) converts the text data of the extracted operation data into TTS audio data (step S509). The audio output component 30 outputs audio indicating the TTS audio data (step S510).

The TTS function of the playback device 4D and the TTS function of the display device 8D are preferably both either on or off. When TTS function of the playback device 4D and the TTS function of the display device 8D are both off, then caption data produced by conventional closed captioning displayed as a caption on the display device 8D.

When the TTS function of the playback device 4D is on and the TTS function of the display device 8D is off, then the text data produced by TTS function is displayed as a caption on the display device 8D.

Also, when the TTS function of the playback device 4D is off and the TTS function of the display device 8D is on, then caption data produced by closed captioning is outputted from the display device 8D as audio.

5-3. Effect

In this embodiment, while the playback device 4D and the display device 8D are connected via the analog cable 36, an analog video signal in which the text data is superposed over the data of the closed captioning can be outputted from the playback device 4D to the display device 8D.

Modification Examples

The control methods pertaining to the first to fifth embodiments are described above, but the present invention is not limited to or by the first to fifth embodiments. For example, the above embodiments may be combined with each one another.

In the above embodiments, the transmission device is formed by the playback device 4 (4A, 4B, 4C, 4D) and the reception device is formed by the display device 8 (8A, 8B, 8C, 8D). However, this is not the only option, and each may be formed by other type of devices.

In the above embodiments, the playback device 4 (4A, 4B) and the display device 8 (8A, 8B) are connected together via the HDMI cable 12, and the playback device 4C (4D) and the display device 8C (8D) are connected via the analog cable 36. However, this is not the only option. For example, the text data may be transmitted from the playback device to the display device by wireless communication, such as Wi-Fi (registered trademark).

Others

Each of the above devices may be configured as a computer system made up of a microprocessor, a ROM (read only memory), a RAM (random access memory), a hard disk drive, a display unit, a keyboard, a mouse, etc. The RAM or the hard disk drive may store a computer program. The microprocessor operates according to the computer program, allowing each device to fulfill its functions. Here, the computer program is made up of a combination of a plurality of command codes that give commands to the computer in order to achieve specific functions.

Furthermore, some or all of the constituent elements of the devices may be constituted by a system LSI (large scale integrated circuit). A system LSI is a super-multifunctional LSI manufactured by integrating a plurality of components on one chip, and more specifically, it is a computer system made up of a microprocessor, a ROM, a RAM, etc. The RAM stores computer programs. The microprocessor operates according to the computer program, allowing the system LSI to achieve its functions.

Furthermore, some or all of the constituent elements of the devices may be configured as an IC card or a single module that can be inserted into and removed from each device. The IC card or module is a computer system made up of a microprocessor, a ROM, a RAM, etc. The IC card or module may include the above-mentioned super-multifunctional LSI. The microprocessor operates according to the computer program, allowing the IC card or module to achieve its functions. The IC card or module may be tamper-resistant.

Also, the present invention may be the methods discussed above. Also, the present invention may be a computer program with which these methods are realized by a computer, or a digital signal composed of this computer program.

Furthermore, the present invention may be the product of recording the above-mentioned computer program or digital signal to a computer-readable non-transitory recording medium such as a flexible disk, hard disk, CD-ROM, MO, DVD, DVD-ROM, DVD-RAM, BD, or semiconductor memory. The present invention may also be the above-mentioned digital signal recorded to these non-transitory recording media.

The present invention may also involve transferring the above-mentioned computer program or digital signal over an electric communication line, a wireless or wired communication line, a network such as the Internet, data broadcasting, or the like.

The present invention may also be a computer system comprising a microprocessor and a memory, wherein the memory stores the above-mentioned computer program, and the above-mentioned microprocessor operates according to the above-mentioned computer program.

Also, the above-mentioned program or the above-mentioned digital signal may be recorded to the above-mentioned non-transitory recording medium and transferred, or the program or the digital signal may be transferred over the above-mentioned network or the like, and thereby implemented by another computer system that is independent.

In the above embodiments, the constituent elements may be constituted by dedicated hardware, or may be realized by executing a software program suitable for each constituent element. In each constituent element, the CPU, processor, or other such program executing component may be realized by reading and executing a software program recorded to a recording medium such as a hard disk or a semiconductor memory.

The method of the present invention can be applied, for example, to a system in which a transmission device and a reception device are connected.

[1] In view of the state of the known technology and in accordance with an aspect of the present invention, a control method outputs audio indicating content of an operation of a transmission device connected to a reception device. The control method comprising a step of accepting the operation of the transmission device, a step of generating operation data indicating the content of the operation by the transmission device, a step of transmitting the generated operation data from the transmission device to the reception device, a step of generating audio data indicating the content of the operation based on the received operation data by the reception device, and a step of outputting audio indicating the audio data at the reception device.

With this configuration, when the operation of the transmission device is accepted at the transmission device, the audio produced by TTS function is not outputted from the transmission device, but is instead outputted from the reception device connected to the transmission device. Consequently, even if there is a constraint when the audio produced by the TTS function is outputted from the transmission device, the audio produced by the TTS function can still be outputted without constraint.

[2] In accordance with a preferred embodiment according to the control method mentioned above, the transmission device and the reception device are connected via a digital cable for transmitting and receiving digital signals.

[3] In accordance with a preferred embodiment according to any one of the control methods mentioned above, the operation data includes text data indicating the content of the operation. In the step of generating the audio data, the audio data is generated based on the text data.

With this configuration, since the audio data is generated based on the text data, the audio data can be generated more easily.

[4] In accordance with a preferred embodiment according to any one of the control methods mentioned above, in the step of transmitting, while a size of the text data exceeds a threshold value, the text data is divided into a plurality of sets of divided text data, and the sets of divided text data are transmitted from the transmission device to the reception device. In the step of generating the audio data, the text data is generated by combining the sets of divided text data, and the audio data is generated based on the text data that has been generated.

With this configuration, even when the size of the text data is relatively large, the text data can still be easily transmitted from the transmission device to the reception device.

[5] In accordance with a preferred embodiment according to any one of the control methods mentioned above, the control method further comprises a step of storing in a memory a table in which text data indicating the content of the operation is associated with ID data for identifying the text data. The operation data includes the ID data. In the step of generating the audio data, the text data corresponding to the ID data that has been received is read from the table. The audio data is generated based on the text data that has been read.

With this configuration, since the ID data is transmitted from the transmission device to the reception device, the size of data transmitted from the transmission device to the reception device can be kept small.

[6] In accordance with a preferred embodiment according to any one of the control methods mentioned above, the transmission device is a playback device that plays video content. The reception device is a display device that displays the video content played by the playback device. The playback device and the display device are connected via an analog cable for transmitting and receiving analog signals.

[7] In accordance with a preferred embodiment according to any one of the control methods mentioned above, in the step of transmitting, a video signal of the video content over which the operation data has been superposed is outputted from the playback device to the display device.

With this configuration, the video signal over which the operation data is superposed can be outputted from the playback device to the display device.

[8] In view of the state of the known technology and in accordance with another aspect of the present invention, a transmission device is connectable to an external device. The transmission device comprises an accepting component, an operation data generator, and a transmitter. The accepting component accepts an operation of the transmission device. The operation data generator generates operation data indicating the content of the operation that has been accepted. The transmitter transmits the operation data that has been generated to the external device.

With this configuration, when the operation of the transmission device is accepted at the transmission device, the audio produced by the TTS function is not outputted from the transmission device, but is instead outputted from an external device connected to the transmission device. Thus, even when constraints arise in the output of the audio produced by the TTS function from the transmission device, the audio produced by the TTS function can still be outputted without constraint.

[9] In accordance with a preferred embodiment according to the transmission device mentioned above, the transmission device is connectable to the external device via a digital cable for transmitting and receiving digital signals. The operation data generator generates the operation data including text data indicating the content of the operation.

With this configuration, the external device can easily generate the audio data based on the text data.

[10] In accordance with a preferred embodiment according to any one of the transmission devices mentioned above, while a size of the text data exceeds a threshold value, the operation data generator divides the text data into a plurality of sets of divided text data. The transmitter transmits the sets of divided text data to the external device.

With this configuration, even when the size of the text data is relatively large, the text data can still be easily transmitted to the external device.

[11] In accordance with a preferred embodiment according to any one of the transmission devices mentioned above, the transmission device further comprises a memory that stores a table in which the text data is associated with ID data for identifying the text data. The operation data generator generates the operation data including the ID data based on the table.

With this configuration, since the ID data is transmitted to the external device, the size of the data transmitted to the external device can be kept small.

[12] In accordance with a preferred embodiment according to any one of the transmission devices mentioned above, the transmission device is a playback device that plays video content. The external device is a display device that displays the video content played by the playback device. The playback device and the display device are connected via an analog cable for transmitting and receiving analog signals.

[13] In accordance with a preferred embodiment according to any one of the transmission devices mentioned above, the transmitter outputs to the display device a video signal of the video content over which the operation data has been superposed.

With this configuration, a video signal over which the operation data has been superposed can be outputted to the display device.

[14] In view of the state of the known technology and in accordance with another aspect of the present invention, a reception device is connectable to an external device. The reception device comprises a receiver, an audio data, and an output component. The receiver receives from the external device operation data indicating content of an operation of the external device. The audio data generator generates audio data indicating the content of the operation based on the operation data that has been received. The output component outputs audio indicating the generated audio data.

With this configuration, when the operation of the external device is accepted at the external device, the audio produced by the TTS function is not outputted from the external device, but is instead outputted from the reception device connected to the external device. Consequently, even if constraints arise in outputting the audio produced by the TTS function from the external device, the audio produced by the TTS function can still be outputted without constraint.

[15] In accordance with a preferred embodiment according to the reception device mentioned above, the reception device is connectable to the external device via a digital cable for transmitting and receiving digital signals. The receiver receives from the external device the operation data including text data indicating the content of the operation.

With this configuration, the audio data can be easily generated based on the text data.

[16] In accordance with a preferred embodiment according to any one of the reception devices mentioned above, while the receiver receives from the external device a plurality of sets of divided text data that have been obtained by dividing the text data, the audio data generator generates the text data by combining the sets of divided text data that have been received, and generates the audio data based on the text data that has been generated.

With this configuration, the text data can be easily received even when the size of the text data is relatively large.

[17] In accordance with a preferred embodiment according to any one of the reception devices mentioned above, the reception device further comprises a memory that stores a table in which the text data is associated with ID data for identifying the text data. The receiver receives the operation data including the ID data. The audio data generator generates the audio data based on the text data corresponding to the ID data that has been received.

With this configuration, since the ID data is received, the size of the data received can be kept small.

[18] In accordance with a preferred embodiment according to any one of the reception devices mentioned above, the external device is a playback device that plays video content. The reception device is a display device that displays the video content played by the playback device. The playback device and the display device are connected via an analog cable for transmitting and receiving analog signals.

[19] In accordance with a preferred embodiment according to any one of the reception devices mentioned above, the receiver receives from the playback device a video signal of the video content over which the operation data has been superposed.

With this configuration, a video signal over which the operation data has been superposed can be inputted or received from the playback device.

[20] In accordance with a preferred embodiment according to any one of the reception devices mentioned above, the output component includes a speaker that outputs audio indicating the content of the operation in response to the operation of the external device.

The present invention can also be realized as a program that causes a computer to function as the characteristic processors included in a transmission device or a reception device, or a program that causes a computer to execute the characteristic steps included in a control method. It should go without saying that such a program can be distributed through a non-transitory computer-readable recording medium such as a CD-ROM (compact disk-read only memory) or over a communication network such as the Internet.

According to the control method, the transmission device, or the reception device, audio produced by TTS function can be outputted without constraint.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the field of control methods, transmission devices and reception devices from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A control method for a transmission device and a reception device externally connected to the transmission device, the control method comprising:
    accepting, by the transmission device, a user operation relative to the transmission device such that the transmission device executes a function corresponding to the user operation relative to the transmission device;
    generating, by the transmission device, text data that includes a character string of a name of the user operation relative to the transmission device;
    transmitting, by the transmission device, the text data that includes the character string of the name of the user operation relative to the transmission device from the transmission device to the reception device;
    receiving, by the reception device, the text data that includes the character string of the name of the user operation relative to the transmission device from the transmission device;
    generating, by a text-to-speech engine of the reception device, audio data indicating the name of the user operation relative to the transmission device based on the text data that includes the character string of the name of the user operation relative to the transmission device and having been transmitted and received from the transmission device; and
    outputting, by the reception device, the name of the user operation relative to the transmission device as an audio based on the audio data.

2. The control method according to claim 1, wherein the transmission device and the reception device are connected via a digital cable for transmitting and receiving digital signals.

3. The control method according to claim 1, wherein
the transmitting of the text data includes dividing the text data into a plurality of sets of divided text data while a size of the text data exceeds a threshold value, and transmitting the sets of divided text data from the transmission device to the reception device, and
the generating of the audio data includes generating the text data by combining the sets of divided text data, and generating the audio data based on the text data that has been generated.

4. A control method for a transmission device and a reception device connected to the transmission device, the control method comprising:
    accepting, by the transmission device, a user operation relative to the transmission device to operate the transmission device according to the user operation;
    generating, by the transmission device, operation data indicating a name of the user operation relative to the transmission device;
    transmitting the operation data from the transmission device to the reception device;
    generating, by the reception device, audio data indicating the name of the user operation based on the operation data transmitted from the transmission device;
    outputting, by the reception device, the name of the user operation as an audio based on the audio data; and
    storing in a memory a table in which text data indicating the name of the user operation is associated with ID data for identifying the text data,
    the operation data including the ID data, and
    the generating of the audio data including reading from the table the text data corresponding to the ID data that has been received, and generating the audio data based on the text data that has been read.

5. The control method according to claim 1, wherein
the transmission device is a playback device that plays video content,
the reception device is a display device that displays the video content played by the playback device, and
the playback device and the display device are connected via an analog cable for transmitting and receiving analog signals.

6. The control method according to claim 5, wherein
the transmitting of the text data includes outputting a video signal of the video content over which the text data has been superposed from the playback device to the display device.

7. A transmission device connectable to an external device, the transmission device comprising:
    an accepting component that accepts a user operation relative to the transmission device such that the transmission device executes a function corresponding to the user operation relative to the transmission device;
    a text data generator that generates text data that includes a character string of a name of the user operation relative to the transmission device; and
    a transmitter that transmits the text data that includes the character string of the name of the user operation relative to the transmission device from the transmission device to the external device.

8. The transmission device according to claim 7, wherein
the transmission device is connectable to the external device via a digital cable for transmitting and receiving digital signals.

9. The transmission device according to claim 7, wherein
the text data generator divides the text data into a plurality of sets of divided text data while a size of the text data exceeds a threshold value, and
the transmitter transmits the sets of divided text data to the external device.

10. The transmission device according to claim 7, further comprising
a memory that stores a table in which the text data is associated with ID data for identifying the text data,
the transmitter transmitting the text data by transmitting the ID data based on the table.

11. The transmission device according to claim 7, wherein
the transmission device is a playback device that plays video content,
the external device is a display device that displays the video content played by the playback device, and
the playback device and the display device are connected via an analog cable for transmitting and receiving analog signals.

12. The transmission device according to claim 11, wherein
the transmitter outputs to the display device a video signal of the video content over which the text data has been superposed.

13. A reception device connectable to an external device, the reception device comprising:
a receiver that receives from the external device text data that includes a character string of a name of a user operation relative to the external device, the user operation being accepted by the external device such that the external device executes a function corresponding to the user operation relative to the external device;
an audio data generator that includes a text-to-speech engine that generates audio data indicating the name of the user operation relative to the external device based on the text data that includes the character string of the name of the user operation relative to the external device and having been received from the external device; and
an output component that outputs the name of the user operation relative to the external device as an audio based on the audio data.

14. The reception device according to claim 13, wherein
the reception device is connectable to the external device via a digital cable for transmitting and receiving digital signals.

15. The reception device according to claim 13, wherein
while the receiver receives from the external device a plurality of sets of divided text data that have been obtained by dividing the text data, the audio data generator generates the text data by combining the sets of divided text data, and generates the audio data based on the text data that has been generated.

16. The reception device according to claim 13, further comprising
a memory that stores a table in which the text data is associated with ID data for identifying the text data,
the receiver receiving the text data by receiving the ID data, and
the audio data generator generating the audio data based on the text data corresponding to the ID data that has been received.

17. The reception device according to claim 13, wherein
the external device is a playback device that plays video content,
the reception device is a display device that displays the video content played by the playback device, and
the playback device and the display device are connected via an analog cable for transmitting and receiving analog signals.

18. The reception device according to claim 17, wherein
the receiver receives from the playback device a video signal of the video content over which the text data has been superposed.

19. The reception device according to claim 13, wherein
the output component includes a speaker that outputs the name of the user operation as the audio in response to the user operation relative to the external device.

* * * * *